(12) United States Patent
Lieblich et al.

(10) Patent No.: US 11,436,735 B2
(45) Date of Patent: Sep. 6, 2022

(54) THREE-DIMENSIONAL OBJECT IMAGE GENERATION

(71) Applicant: ANALOGIC CORPORATION, Peabody, MA (US)

(72) Inventors: David Lieblich, Worcester, MA (US); Nirupam Sarkar, Westford, MA (US); Daniel B. Keesing, Brookline, MA (US)

(73) Assignee: ANALOGIC CORPORATION, Peabody, MA (US)

( * ) Notice: Subject to any disclaimer, the term of this patent is extended or adjusted under 35 U.S.C. 154(b) by 88 days.

(21) Appl. No.: 15/550,402

(22) PCT Filed: Feb. 11, 2015

(86) PCT No.: PCT/US2015/015334
§ 371 (c)(1),
(2) Date: Aug. 11, 2017

(87) PCT Pub. No.: WO2016/130116
PCT Pub. Date: Aug. 18, 2016

(65) Prior Publication Data
US 2018/0033150 A1 Feb. 1, 2018

(51) Int. Cl.
*G06K 9/00* (2022.01)
*G06T 7/12* (2017.01)
*G06T 15/08* (2011.01)

(52) U.S. Cl.
CPC ............... *G06T 7/12* (2017.01); *G06T 15/08* (2013.01); *G06T 2207/10081* (2013.01); *G06T 2207/20132* (2013.01); *G06T 2207/30112* (2013.01)

(58) Field of Classification Search
CPC ........... G06T 15/08; G06T 2207/10081; G06T 2207/20132; G06T 2207/30112; G06T 7/12
See application file for complete search history.

(56) References Cited

U.S. PATENT DOCUMENTS

2005/0231530 A1   10/2005  Liang et al.
2006/0056730 A1*   3/2006  Matsumoto ............. G06T 15/08
                                                      382/285
(Continued)

FOREIGN PATENT DOCUMENTS

GB        2465888 A      6/2010
WO     2012/128754 A1    9/2012

OTHER PUBLICATIONS

Corresponding PCT International Application No. PCT/US2015/015334, Filing Date Feb. 11, 2015, International Search Report and Written Opinion, dated Feb. 22, 2016 (21 pgs).

(Continued)

*Primary Examiner* — Xin Jia
(74) *Attorney, Agent, or Firm* — TraskBritt

(57) ABSTRACT

A volume of an object is extracted from a three-dimensional image to generate a three-dimensional object image, where the three-dimensional object image represents the object but little to no other aspects of the three-dimensional image. The three-dimensional image is yielded from an examination in which the object, such as a suitcase, is situated within a volume, such as a luggage bin, that may contain other aspects or objects that are not of interest, such as sidewalls of the luggage bin. The three-dimensional image is projected to generate a two-dimensional image, and a two-dimensional boundary of the object is defined, where the two-dimensional boundary excludes or cuts off at least some of the uninteresting aspects. In some embodiments, the two-dimensional boundary is reprojected over the three-dimen- (Continued)

sional image to generate a three-dimensional boundary, and voxels comprised within the three-dimensional boundary are extracted to generate the three-dimensional object image.

20 Claims, 11 Drawing Sheets

(56) References Cited

U.S. PATENT DOCUMENTS

| | | |
|---|---|---|
| 2008/0123895 A1 | 5/2008 | Gable et al. |
| 2008/0231530 A1 | 9/2008 | Rao et al. |
| 2011/0228997 A1 | 9/2011 | Sharp et al. |
| 2013/0202217 A1* | 8/2013 | Pavlovich ............. G06T 11/008 382/218 |
| 2013/0218531 A1* | 8/2013 | Deichmann ............ A61C 9/004 703/1 |
| 2013/0328874 A1 | 12/2013 | Smith-Casem et al. |
| 2015/0235369 A1* | 8/2015 | Ishida ..................... G06T 19/00 382/131 |

OTHER PUBLICATIONS

European Communication pursuant to Article 94(3) EPC for European Application No. 15767362.5, dated May 11, 2020, 8 pages.
European Communication pursuant to Article 94(3) EPC for European Application No. 15767362.5, dated Dec. 21, 2021, 6 pages.

* cited by examiner

THREE-DIMENSIONAL OBJECT IMAGE GENERATION

CROSS-REFERENCE TO RELATED APPLICATION

This application claims the benefit under 35 U.S.C. § 371 of International Patent Application PCT/US2015/015334, filed Feb. 11, 2015, designating the United States of America and published in English as International Patent Publication WO/2016/130116 A1 on Aug. 18, 2016.

TECHNICAL FIELD

The present application relates to generating a three-dimensional (3D) object image of an object, such as a bag or piece of luggage, where the 3D object image of the object is separated or obtained from a 3D image depicting both the object and a secondary object. It finds particular application to security environments, where an object, such as a bag, may be examined by a radiation system while the object is situated within a container, such as a luggage bin, to yield a 3D image depicting both the object and the container, but where a focus on the object, instead of the bin, is desired. However, it may also find applicability to medical and/or industrial environments where an object may be examined while situated within, upon, etc., a secondary object.

BACKGROUND

Today, radiation systems such as computed tomography (CT) systems, single-photon emission computed tomography (SPECT) systems, digital projection systems, and/or line-scan systems, for example, are useful to provide information, or images, of interior aspects of an object under examination. The object is exposed to rays of radiation photons (e.g., x-ray photons, gamma ray photons, etc.) and radiation photons traversing the object are detected by a detector array positioned substantially diametrically opposite a radiation source relative to the object. A degree to which the radiation photons are attenuated by the object (e.g., absorbed, scattered, etc.) is measured to determine one or more properties (e.g., density, z-effective, shape, etc.) of the object and/or one or more properties of various aspects (e.g., sub-objects) of the object. For example, highly dense aspects of an object typically attenuate more radiation than less dense aspects, and thus an aspect having a higher density, such as a bone or metal, for example, may be apparent when surrounded by less dense aspects, such as muscle or clothing.

Radiation systems are often used at security checkpoints to examine the contents of baggage. For example, radiation systems are generally used to examine carry-on and checked luggage at airports for potential threat items. Traditionally, checked luggage has been placed directly on an object translator (e.g., a conveyor belt) and translated through an examination region of the radiation system. However, airports have recently begun placing the checked luggage in containers (e.g., luggage bins) to increase handling efficiency (e.g., by standardizing the unit of input to limit performance degradations) and/or to mitigate jamming on a conveyor assembly that conveys the luggage through the examination region. Due to the size and/or weight of checked luggage, these containers are often rigidly constructed and sized to ensure carriage of the largest expected bags. This increases the size of the 3D volume presented for reconstruction, detection, on-screen visualization, and/or storage. This size increase negatively impacts system performance in each of these areas, requiring longer processing, and analysis times and/or more expensive computational and archival resources.

BRIEF SUMMARY

Aspects of the present application address the above matters, and others. According to one aspect, a method for generating a three-dimensional object image from a three-dimensional image depicting an object and a secondary object is provided. The method comprises projecting the three-dimensional image along a first axis to generate a first two-dimensional projection image and defining a two-dimensional boundary of the object based upon the first two-dimensional projection image. The method also comprises defining a three-dimensional boundary of the object within the three-dimensional image based upon the two-dimensional boundary and extracting voxels comprised within the three-dimensional boundary to generate the three-dimensional object image depicting the object but not depicting the secondary object.

According to another aspect, a system is provided. The system comprises a processing unit and memory configured to store instructions that when executed by the processing unit perform a method. The method comprises projecting a three-dimensional image of an object and a secondary object in which the object is situated during a radiation examination to generate a two-dimensional projection image. The method also comprises defining a two-dimensional boundary of the object based upon the two-dimensional projection image and reprojecting the two-dimensional boundary over a portion of the three-dimensional image to define a three-dimensional boundary of the object. The method also comprises extracting voxels comprised within the three-dimensional boundary to generate a three-dimensional object image depicting the object but not depicting the secondary object.

According to another aspect a computer-readable medium comprising computer executable instructions that when executed perform a method is provided. The method comprises projecting a three-dimensional image along a first axis to generate a first two-dimensional projection image and defining a two-dimensional boundary of the object based upon the first two-dimensional projection image. The method also comprises defining a three-dimensional boundary of the object within the three-dimensional image based upon the two-dimensional boundary and extracting voxels comprised within the three-dimensional boundary to generate the three-dimensional object image depicting the object but not depicting the secondary object.

According to yet another aspect, a method for removing voxels representative of a secondary object from an image slice representative of an object and the secondary object is provided. The method comprises defining a first search path within the image slice and identifying a first intersection between the first search path and the secondary object. The method also comprises defining a second search path within the image slice and identifying a second intersection between the second search path and the secondary object. The method further comprises fitting a curve to the first intersection and the second intersection and removing voxels in a region defined by the curve, the voxels representative of the secondary object.

Those of ordinary skill in the art will appreciate still other aspects of the present application upon reading and understanding the appended description.

BRIEF DESCRIPTION OF THE DRAWINGS

The application is illustrated by way of example and not limitation in the figures of the accompanying drawings, in which like references generally indicate similar elements and in which.

DETAILED DESCRIPTION

Figure 1:
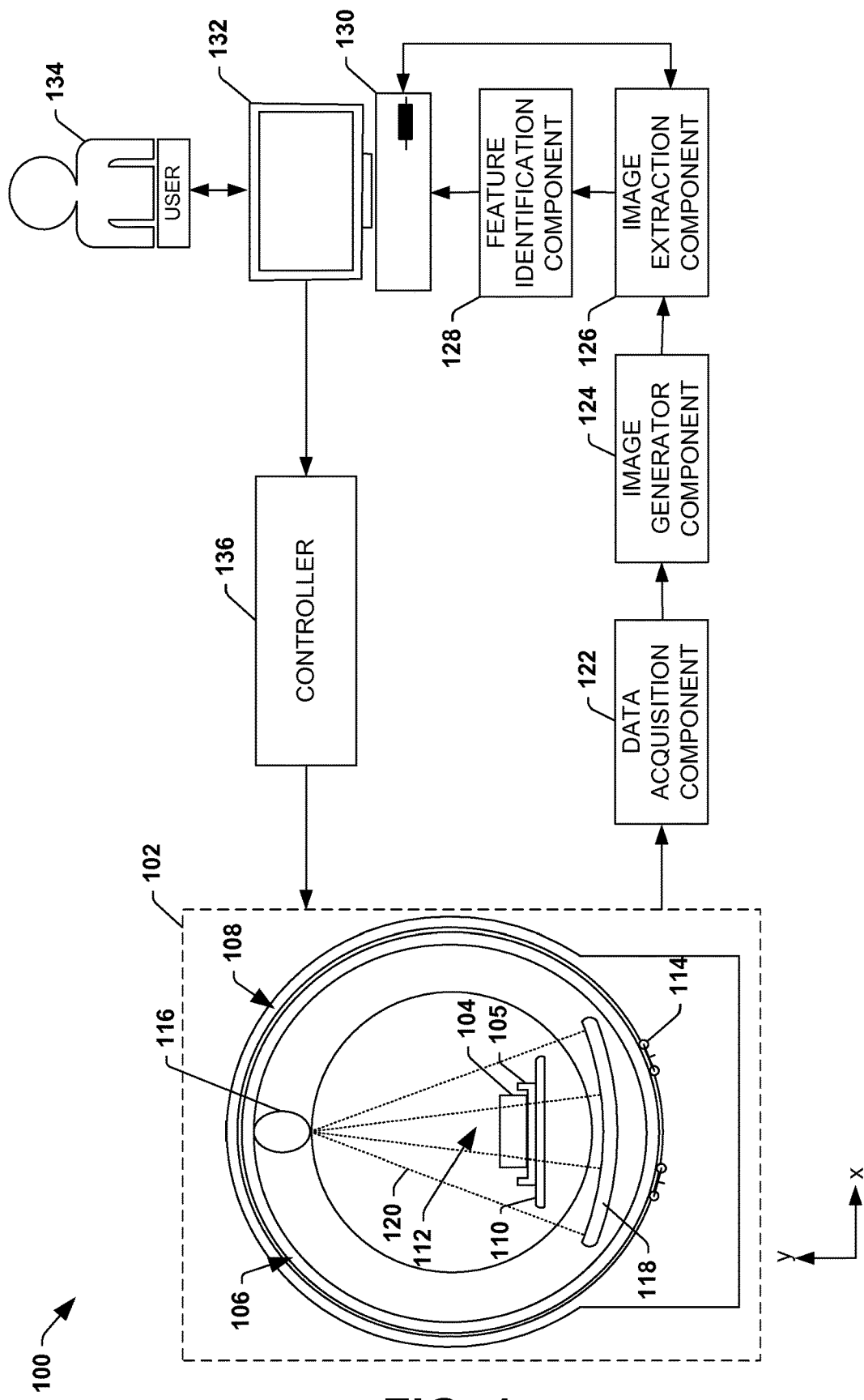
FIG. 1 illustrates an example radiation system.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

Among other things, a radiation system comprising an image extraction component is provided. The radiation system is configured to examine an object (e.g., baggage) via radiation (e.g., x-rays, gamma rays, etc.). During the examination, the object is situated within a secondary object, such as a container, and a 3D image is generated representing the object and the secondary object. The image extraction component is configured to analyze the 3D image to separate a portion of the 3D image depicting the object from a portion of the 3D image depicting the secondary object. In this way, a 3D object image depicting a volume of the object (e.g., and not depicting the secondary object) is extracted from the 3D image. In some embodiments, the 3D object image is subsequently analyzed by a feature identification component to determine whether the object comprises one or more specified features (e.g., such as known threat objects).

As will be described in more detail below, in some embodiments the image extraction component is configured to analyze the 3D image, or 2D projection images generated therefrom, to identify one or more edges of the object within the 3D image and/or the 2D projection image(s). Using these edges, a volumetric boundary of the object can be defined within the 3D image, and voxels comprised within a volume defined by the volumetric boundary can be extracted to generate the 3D object image (e.g., where the 3D object image represents little to none of the secondary object). In some embodiments, a buffer region is defined spatially proximate the volumetric boundary, and voxels comprised within the buffer region are also extracted to be included in the 3D object image.

FIG. 1 illustrates an example radiation system 100 comprising an image extraction component 126 as provided for herein. In some embodiments, the radiation system 100 is configured as a computed tomography (CT) system configured to rotate a radiation source 116 and a detector array 118 about an object 104 during an examination. In other embodiments, the radiation system 100 may be configured as another form of 3D imaging system, such as a single-photon emission computed tomography (SPECT) system or a tomosynthesis system, for example.

The radiation system 100 comprises an examination unit 102 configured to examine objects 104, such as baggage. In some embodiments, such objects 104 are situated within a secondary object 105, such as a luggage bin, and the examination unit 102 further (e.g., undesirably) examines the secondary object 105. In other embodiments, the object 104 may be embedded within and/or integral to the secondary object 105. By way of example, in medical applications, the object 104 may be a region of interest, such as a particular organ or bone, and the secondary object 105 may be a region of the body surrounding the region of interest.

The examination unit 102 comprises a rotating gantry 106 and a (stationary) support structure 108 (e.g., which may encase and/or surround at least a portion of the rotating gantry 106 (e.g., as illustrated with an outer, stationary ring, surrounding an outside edge of an inner, rotating ring)). During an examination of an object 104, the object 104 and the secondary object 105 are translated into and/or through an examination region 112 (e.g., a hollow bore in the rotating gantry 106) via a support article 110, such as a conveyor belt, roller assembly, etc. While the object 104 is situated within the examination region 112, the object 104 and the secondary object 105 are exposed to radiation 120.

The rotating gantry 106 may surround a portion of the examination region 112 and may comprise the radiation source 116 (e.g., an ionizing radiation source such as an x-ray source or gamma-ray source) and the detector array 118. In some embodiments, the detector array 118 is mounted on a substantially diametrically opposite side of the rotating gantry 106 relative to the radiation source 116, and during an examination of the object 104, the rotating gantry 106 (e.g., including the radiation source 116 and detector array 118) is rotated about the object 104 by a rotor 114 (e.g., belt, drive shaft, chain, roller truck, etc.). Because the radiation source 116 and the detector array 118 are mounted to the rotating gantry 106, a relative position between the detector array 118 and the radiation source 116 may be substantially maintained during the rotation of the rotating gantry 106. In embodiments where the object 104 is translated during the examination in a direction substantially parallel to an axis about which the rotating gantry 106 rotates, a helical examination is performed on the object 104.

During the examination of the object 104, the radiation source 116 emits cone-beam or fan-beam shaped radiation 120 from a focal spot of the radiation source 116 (e.g., a region within the radiation source 116 from which radiation 120 emanates) into the examination region 112. Such radiation 120 may be emitted substantially continuously and/or may be emitted intermittently (e.g., a brief pulse of radiation 120 is emitted followed by a resting period during which the radiation source 116 is not activated). Further, the radiation 120 may be emitted at a single energy spectrum or multi-energy spectrums depending upon, among other things, whether the radiation system 100 is configured as a single-energy system or a multi-energy (e.g., dual-energy) system.

As the emitted radiation 120 traverses the object 104 and/or the secondary object 105, the radiation 120 may be attenuated differently by different aspects of the object 104 and/or the secondary object 105. Because different aspects attenuate different percentages of the radiation 120, the number of photons detected by respective detector cells of the detector array 118 may vary. For example, more dense aspects of the object(s) 104, such as a metal plate, may attenuate more of the radiation 120 (e.g., causing fewer photons to impinge a region of the detector array 118 shadowed by the more dense aspects) than less dense aspects, such as clothing.

Radiation detected by the detector array 118 may be directly or indirectly converted into analog signals. The analog signal(s) may carry information indicative of the radiation detected by the detector array 118. The content of the information may be a function of, among other things, the type of detector array 118 employed within the radiation system 100. By way of example, where the detector array 118 is a charge-integrating detector array, the information may be indicative of the number of radiation photons detected over a measurement period. As another example, where the detector array 118 is a photon counting detector array, the information may be indicative of a detection location and a detection time for respective detected radiation photons.

The analog signals generated by respective detector cells of the detector array may be transmitted from the detector array 118 to a data acquisition component 122 operably coupled to the detector array 118. The data acquisition component 122 is configured to convert the analog signals into digital signals and/or to compile signals that were transmitted within a predetermined time interval, or measurement interval, using various techniques (e.g., integration, photon counting, etc.). The compiled signals are typically in projection space and are, at times, referred to as projections.

The projections and/or digital signals generated by the data acquisition component 122 may be transmitted to an image generator component 124 operably coupled to the data acquisition component 122. The image generator component 124 is configured to convert at least some of the data from projection space to image space using suitable analytical, iterative, and/or other reconstruction techniques (e.g., tomosynthesis reconstruction, back-projection, iterative reconstruction, etc.) and/or to compile at least some of the data to generate a three-dimensional image of the object 104 and the secondary object 105.

The three-dimensional image, representing the object 104 and the secondary object 105, may be transmitted to an image extraction component 126 configured to extract a volume of the object 104 from the three-dimensional image to generate a three-dimensional object image (e.g., which does not include a representation of the secondary object 105). In this way, a portion of the three-dimensional image that is representative of the object 104 is extracted from a portion of the three-dimensional image that is representative of the secondary object 105.

To extract a volume of the object 104 from the three-dimensional image, the three-dimensional image and/or projections generated therefrom, are searched by the image extraction component 126 to identify one or more edges of the object 104 that are visible within the three-dimensional image. Based upon the edges that are identified, a volumetric boundary of the object 104 is defined within the three-dimensional image, and voxels comprised within the volumetric boundary are extracted to extract a volume of the object 104 (e.g., thus generating a three-dimensional object image that depicts little, if any, of the secondary object 105).

The three-dimensional object image generated by the image extraction component 126 may be transmitted to a terminal 130 for visualization on a monitor 132 and/or to a feature identification component 128 configured to identify specified features of the object 104 using the three-dimensional object image and/or a two-dimensional projection image of the object 104 generated from the three-dimensional object image. By way of example, the feature identification component 128 may analyze the image for one or more object characteristics (e.g., density characteristics, z-effective characteristics, shape characteristics, etc.) that match object characteristics of an item of interest, such as a potential threat items. If the feature identification component 128 identifies a match between an object characteristic of the object 104 and an object characteristic of an item of interest, the feature identification component 128 may issue an alert to notify a user 134, for example, of the possible match. It may be appreciated that because the data corresponding to the object 104 has been separated from data corresponding to the secondary object 105, computational cost(s) may be reduced for the visualization and/or feature identification (e.g., relative to computational cost(s) if the data corresponded to both the object 104 and the secondary object 105).

Results of the feature identification analysis performed by the feature identification component 128, a three-dimensional object image generated by the image extraction component 126, and/or a two-dimensional projection image generated from the three-dimensional object image may be transmitted to a terminal 130, or workstation (e.g., a computer), configured to receive the results and/or images, which can be displayed on a monitor 132 to a user 134 (e.g., security personnel, medical personnel, etc.). In this way, the user 134 can inspect the image(s) to identify areas of interest within the object(s) 104 and/or be notified of possible items of interest (e.g., such as potential threat items contained with an object 104). The terminal 130 can also be configured to receive user input which can direct operations of the examination unit 102 (e.g., a speed of gantry rotation, an energy level of the radiation, turn on/off the radiation source 116, halt translation of the secondary object 105 and the object 104, etc.).

Further, as will be described in more detail below, the image extraction component 126 and the terminal 130 may be in operable communication to provide a channel by which user input can be received to assist the image extraction component 126 in identifying an appropriate volumetric boundary within the three-dimensional image.

In the example radiation system 100, a controller 136 is operably coupled to the terminal 130. The controller 136 may be configured to control operations of the examination unit 102, for example. By way of example, in some embodiments, the controller 136 may be configured to receive information from the terminal 130 and to issue instructions to the examination unit 102 indicative of the received information (e.g., converting user input into commands for the examination unit 102).

It may be appreciated that components of the radiation system 100 described above are merely example components and the arrangement of such components is merely an example arrangement. Such components and/or arrangements are not intended to be interpreted in a limiting manner, such as necessarily specifying the location, inclusion, and/or relative position of the components. By way of example, in some embodiments, the data acquisition component 122 is part of the detector array 118 and/or is located on a rotating gantry 106 of the radiation system 100.

Figure 2:
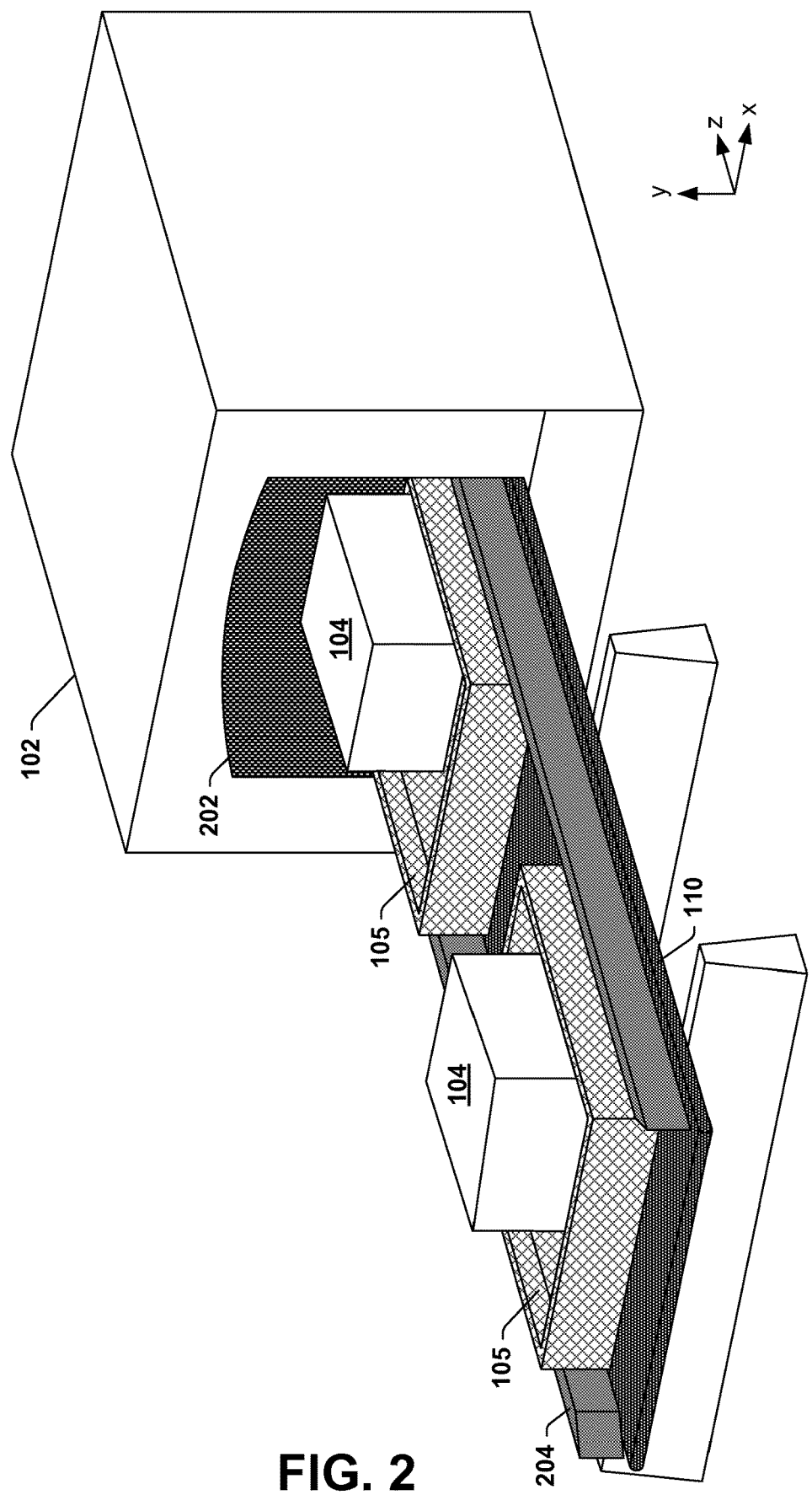
FIG. 2 illustrates a perspective view of an example radiation system.

Referring to FIG. 2, a perspective view of the examination unit 102 is provided. Objects 104, such as luggage, may be situated within secondary objects 105, such as luggage bins, and translated through an entryway 202 of the examination unit 102 via a support article 110, such as a conveyor assembly, mechanical roller assembly, gravity-fed roller assembly, etc. In some embodiments, guide rails 204 may assist in guiding the secondary object 105 into the entryway 202. Typically, the direction in which the secondary object 105 is translated is referred to as the z-direction. Moreover, in embodiments where the radiation source 116 and/or detector array 118 rotate about the object 104, an axis of rotation is typically substantially parallel to the z-direction (e.g., the radiation source 116 and/or detector array rotate within an x, y plane).

The secondary objects 105 are typically larger than the objects 104 and are configured to accommodate the objects 104 situated therein. For example, a secondary object 105 may have a greater width (e.g., measured in the x-direction) than an object 104 situated therein and/or the secondary object 105 may have a greater length (e.g., measured in the z-direction) than the object 104 situated therein. Moreover, due to the weight of the objects 104 (e.g., which may weigh 50 lbs. or more) and/or size of the objects 104 (e.g., which may be 3 feet or more in length and/or 2 feet or more in width), the secondary objects 105 are typically constructed of a substantially rigid, durable material (e.g., such as a plastic polymer and/or a rubber compound).

While the object 104 is located within the examination unit 102, the object 104 and the secondary object 105 are exposed to radiation 120, and radiation traversing the object 104 and/or the secondary object 105 is measured by a detector array (e.g., typically enclosed within a housing of the examination unit). Due to the construction of the secondary objects 105, such secondary objects 105 may attenuate (e.g., scatter or absorb) a non-negligible amount of radiation (e.g., thus causing the secondary objects 105 to be radiation semi-opaque). As a result, secondary objects 105 may appear in images resulting from the examination.

Figure 3:
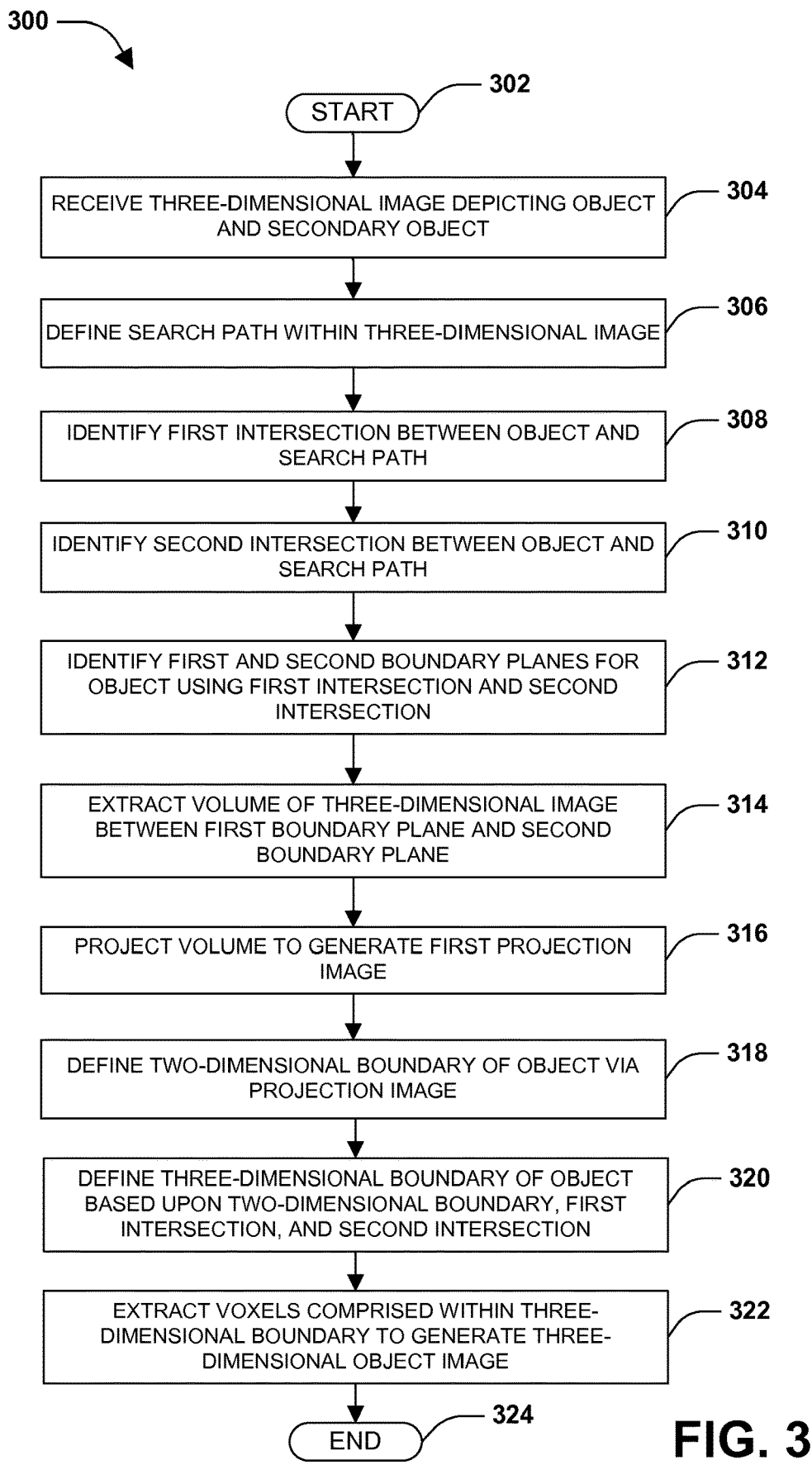
FIG. 3 illustrates flow diagram illustrating an example method for extracting a volume of an object from a three-dimensional image depicting the object and a secondary object.

Referring to FIG. 3, an example method 300 for extracting a volume of an object 104 from a three-dimensional image depicting the object 104 and a secondary object 105 to generate a three-dimensional object image (e.g., depicting merely the object 104 and a defined buffer region neighboring the object 104 (e.g., if desired)) is provided. FIGS. 4-12 are provided to further illustrate at least some of the acts of the example method 300. In some embodiments, such an example method 300 may be performed by the image extraction component 126 to extract the three-dimensional volume of the object 104.

Figure 4:
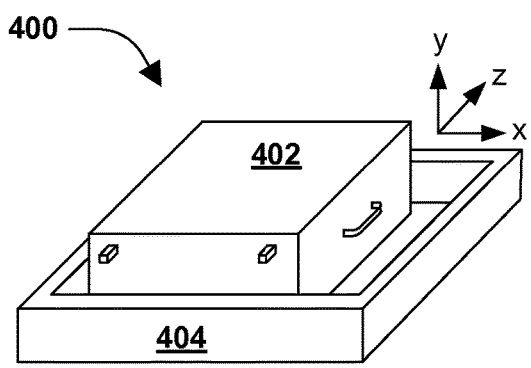
FIG. 4 illustrates a three-dimensional image depicting an object and a secondary object.
Figure 5:
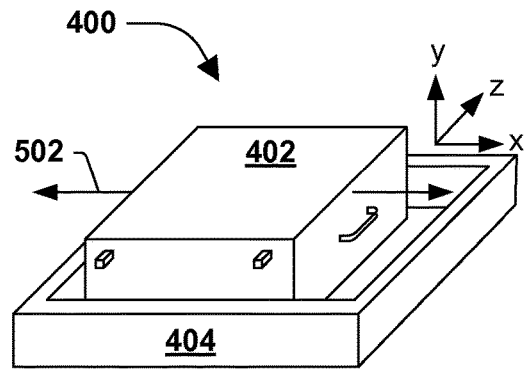
FIG. 5 illustrates a three-dimensional image depicting an object and a secondary object having a search path imposed thereon.
Figure 6:
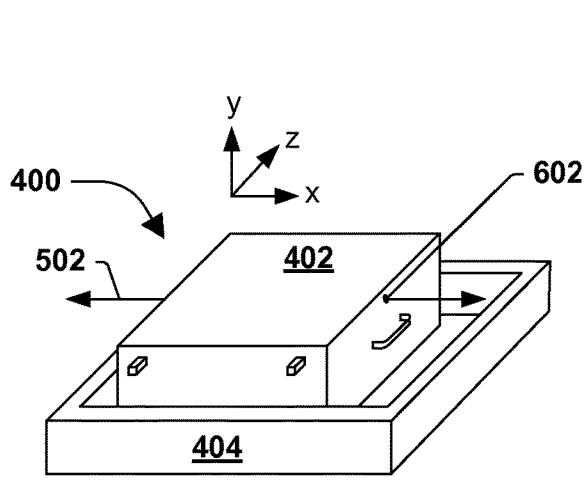
FIG. 6 illustrates a three-dimensional image depicting a first intersection of an object and a search path.
Figure 7:
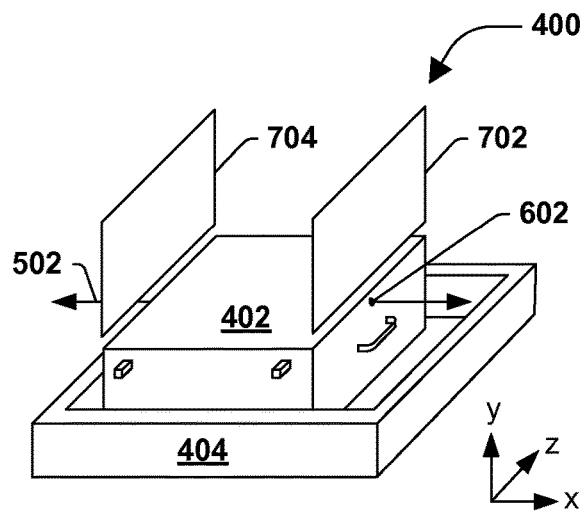
FIG. 7 illustrates boundary planes of a three-dimensional image depicting an object and a secondary object.

The example method 300 begins at 302, and a three-dimensional image is received (e.g., from an image generator component 124) at 304. The three-dimensional image depicts the object 104 and the secondary object 105 in which the object 104 is situated during an examination by the examination unit 102. By way of example, referring to FIG. 4, a three-dimensional image 400 depicting a suitcase 402 and a luggage bin 404 in which the suitcase 402 is situated during an examination may be received at 304. It may be appreciated that while FIG. 4 illustrates a suitcase 402 having a substantially rectangular shape, not all objects 104 that are examined may have such a defined shape. By way of example, objects 104 may include duffle bags or other items that have an irregular shape and/or whose shape is defined based upon the content of the object 104 (e.g., where a filled duffle bag may have a substantially cylindrical shape while a duffle bag that is half full may have a less defined shape). Moreover, the term suitcase is used generically herein to refer to an item configured to store other items and is not intended to infer a geometrical shape. Accordingly, the term suitcase may refer to a duffle bag, briefcase, purse, and/or any other object(s) that may be examined.

At 306 in the example method 300, a search path is defined within the three-dimensional image. The search path describes a linear or non-linear approach for locating an edge(s) of the object 104 within the three-dimensional image. By way of example, referring to FIG. 5, a line 502 has been imposed on the three-dimensional image 400 to illustrate a search path for examining the three-dimensional image 400 to locate edges of the suitcase 402. In the illustration, the search path extends in the x-direction at a predefined y-coordinate and z-coordinate, although as further described below, in other embodiments the search path may extend in a different direction.

The search path may be defined in any number of ways. By way of example, in some embodiments, the search path is pre-defined. As an example, the search path may be defined as a linear path extending in a specified direction, such as the x-direction (e.g., a direction perpendicular to an axis of rotation for the rotating gantry 106) at a predetermined height (e.g., measured in a y-direction) above a support article 110 and/or at a determined location in the z-direction. In some embodiments, the search path may be defined based upon information that is known about the object 104 and/or the secondary object 105. By way of example, dimensions of the luggage bin 404 that are known (e.g., because respective luggage bins have similar dimensions and/or because a unique identifier on a luggage bin can be utilized to identify the dimensions of the luggage bin)

may be used to assist in defining the search path. By way of example, a height of the luggage bin 404 may be known and a y-coordinate of the search path may be selected based upon the height of the luggage bin 404 (e.g., the y-coordinate of the search path may be chosen so as to cause the search path to not intersect the luggage bin 404).

As another example, the search path may be defined as a function of an orientation of the object 104 and/or secondary object 105 at the time of the examination. By way of example, Eigen analysis may be performed on the three-dimensional image 400 to identify Eigen vectors of the luggage bin 404, for example, and the search path may be defined as a function of the Eigen vectors. As an example, the search path may be defined as a linear path parallel to a largest Eigen vector, for example.

In still other embodiments, the search path may be defined based upon user input. By way of example, the three-dimensional image may be presented to the user via the terminal 130, and the image extraction component 126 may request that the user draw a linear or non-linear search path within the three-dimensional image. Thus, in such an embodiment, the image extraction component 126 defines a search path based at least in part upon input received from the user responsive to the request.

At 308 in the example method 300, a first intersection between the object and the search path is identified. By way of example, referring to FIG. 6, a black dot 602 has been imposed on the three-dimensional image 400 at a first intersection between the suitcase 402 and the line 502. The first intersection typically represents a first edge (e.g., outer perimeter) of the object 104.

The first intersection may be identified manually (e.g., with the aid of user input) and/or programmatically. By way of example, in some embodiments, the user is presented with the three-dimensional image having imposed thereon the search path defined at 306 and the user is requested to identify a first location where the search path intersects the object 104. Based upon user input received responsive to such a request, the first intersection is identified by the image extraction component 126.

In other embodiments, the first intersection may be identified based upon one or more characteristics of respective voxels of the three-dimensional image. By way of example, respective voxels of the three-dimensional image intersecting the search path may be associated with a density characteristic (e.g., or z-effective characteristic). The density characteristic of a first voxel may be compared to the density characteristic of one or more adjacent voxels. If a difference between the density characteristic of the first voxel and the density characteristic of the one or more adjacent voxels exceeds a predetermined threshold, it may be likely that the first voxel represents an edge of the object 104 and thus represents the first intersection. In still other embodiments, density characteristics, z-effective characteristics, and/or other characteristics of respective voxels may be utilized to identify an edge of the object 104 and/or identify an intersection of the object 104 and the search path.

At 310 in the example method 300, a second intersection between the object and the search path is identified. In some embodiments, the second intersection represents a second edge of the object 104 (e.g., diametrically opposing the first edge). The second intersection may be identified manually and/or programmatically, such as via the aforementioned techniques. In this way, using the search path, two outer bounds of the object 104 may be identified (e.g., where a first outer bound is identified by the first intersection and a second outer bound is identified by the second intersection), for example.

Using the first intersection and the second intersection, boundary planes for the object 104 may be identified at 312. By way of example, referring to FIG. 7, a first boundary plane 702 representing a first plane of the three-dimensional image 400 at the first intersection (e.g., represented by the black dot 602) and a second boundary plane 704 representing a second plane of the three-dimensional image 400 at the second intersection is illustrated. The boundary planes are typically perpendicular to the search path, however other angles are possible for both or either intersection(s). By way of example, in the example illustration, the search path is defined as extending in the x-direction, and thus the first and second boundary planes 702, 704 extend in the y-direction and the z-direction. It will be appreciated that while the boundary planes are illustrated as hovering above the suitcase, the boundary planes extend further in the y-direction and in the z-direction (e.g., to cover the suitcase).

A volume of the three-dimensional image between the first boundary plane 702 and the second boundary plane 704 is extracted at 314, and the volume is projected to generate a first projection image at 316. As used herein, a projection image refers to a two-dimensional image in which respective pixels represent a summation of voxels along parallel lines penetrating the volume along a consistent direction (e.g., perpendicular) relative to the 2D planes. For example, in embodiments where summation is parallel to a coordinate direction of the volume, a row or column of voxels of the three-dimensional image is collapsed into a corresponding sum in the projection image. Accordingly, a density characteristic of a first pixel of the projection image may be equal to a sum or average of the density characteristics of voxels along a projection path represented by the first pixel. Typically, the three-dimensional image is projected in the direction of the search path, and respective pixels represent voxels extending in the direction of the search path.

Figure 8:
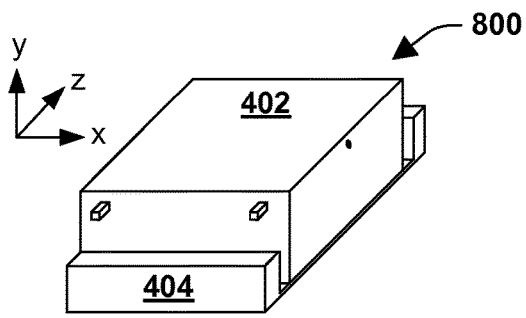
FIG. 8 illustrates a sub-image of a three-dimensional image depicting an object and a secondary object.

Referring to FIG. 8, a volume 800 of the three-dimensional image 400 between the first boundary plane 702 and the second boundary plane 704 is illustrated (e.g., where the three-dimensional image 400 has been trimmed to include merely a volume bounded by the first boundary plane 702 and the second boundary plane 704). It may be appreciated that such a volume 800 comprises at least some remnants of the luggage bin 404. Moreover, portions of the suitcase 402, such as a handle on the right side of the suitcase 402, may not be included within the volume 800 because the first intersection occurs (e.g., along the search path) before the handle and thus the handle is "cut off" by the first boundary plane 702.

Figure 9:
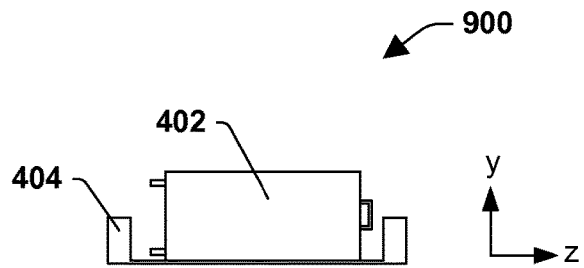
FIG. 9 illustrates a two-dimensional projection image.

Referring to FIG. 9, a two-dimensional projection image 900 is illustrated, wherein the volume 800 has been projected at the first boundary plane 702 to yield the projection image 900. Respective pixels of the projection image 900 correspond to a row of voxels extending in the direction of the search path (e.g., extending in the x-direction). In the projection image, the three-dimensional image 400 of the suitcase has thus been collapsed in the x-direction so that the suitcase is now represented by a two-dimensional image extending merely in the y-direction and the z-direction. A pixel of the projection image corresponds to a row of voxels that (e.g., previously) extended in the x-direction but that has been collapsed down to a single pixel.

At 318 in the example method 300, a two-dimensional boundary of the object 104 is defined via the two-dimensional projection image. The two-dimensional boundary may be defined using techniques similar to those described above to identify an edge of the object 104. By way of example, a user may be presented with the projection image and asked to select (e.g., highlight, mark, etc.) a portion of the projection image representative of the object 104. In such instances, the two-dimensional boundary may be defined based upon received user input. In other embodiments, density characteristics, z-effective characteristics, and/or other characteristics of respective pixels may be analyzed to identify possible edges of the object 104, and a boundary can be defined using the possible edges.

In still other embodiments, the two-dimensional projection image may itself be projected along one or more axes to generate one or more one-dimensional projection lines. By way of example, the two-dimensional projection image may be projected along a first axis of the projection image to generate a first one-dimension projection line. Accordingly, respective points on the one-dimensional projection line represent a row of pixels extending along the first axis, and the first one-dimensional projection line can be analyzed to identify edges of the object 104 that are visible along a second axis (e.g., perpendicular to the first axis). The projection image can also be projected along the second axis to generate a second one-dimensional projection line, and the second one-dimensional projection line can be analyzed to identify edges of the object 104 that are visible along the first axis, for example.

Figure 10:
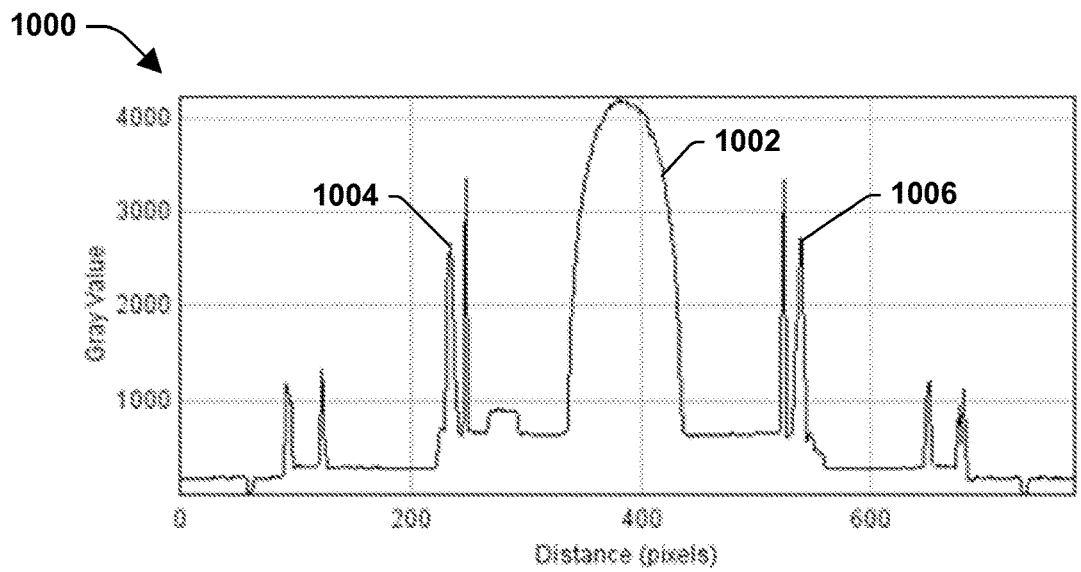
FIG. 10 illustrates a one-dimensional projection line.

As an example, with reference to FIG. 10, a graph 1000 illustrating a one-dimensional projection line 1002 generated by projecting the projection image 900 along the y-axis is illustrated. Accordingly, respective points along the projection line 1002 represent one or more pixels of the projection image 900 extending in the y-direction. Using such a graph 1000, left and right edges of the suitcase 402 may be identified. For example, a first peak 1004 in the projection line 1002 may be indicative of a left edge of the suitcase 402 (e.g., to which castors, wheels, feet, etc., of the suitcase are attached as illustrated in FIG. 9) and a second peak 1006 in the projection line 1002 may be indicative of a right edge of the suitcase 402 (e.g., to which a top handle of the suitcase is attached as illustrated in FIG. 9). It may be appreciated that, in some embodiments, prior to identifying peaks in the projection line 1002, the projection line may be filtered to reduce miscellaneous peaks (e.g., noise) in the projection line 1002, for example. It may also be appreciated that identifying edges based upon peaks is merely one technique for identifying edges from a one-dimensional projection line 1002 and that other techniques are also contemplated. By way of example, edges may be identified based upon amplitude of the one-dimensional projection line 1002, slope of the projection line 1002, and/or curvature threshold(s).

Figure 11:
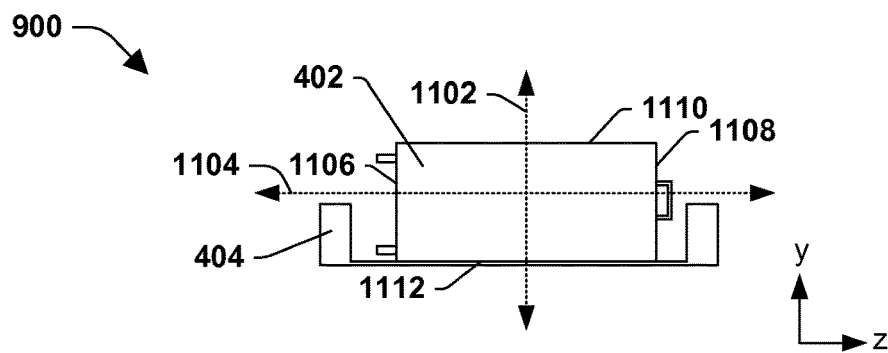
FIG. 11 illustrates a two-dimensional projection image.

Referring to FIG. 11, the projection image 900 is illustrated again, having imposed thereon a first line 1102 representing a first axis along which the projection image 900 was projected to generate the projection line 1002 and a second line 1104 representing a second axis along which the projection image 900 may be projected to generate a second projection line. Using these two projection lines, edges of the suitcase 402 intersecting the projection lines can be identified. For example, a first (e.g., left) edge 1106 and a second (e.g., right) edge 1108 may be identified using the first projection line 1002 and a third (e.g., top) edge 1110 and a fourth (e.g., bottom) edge 1112 may be identified using the second projection line. Based upon these four edges, a two-dimensional boundary of the object may be identified (e.g., where the boundary is defined by the edges 1106, 1108, 1110 and 1112).

At 320 in the example method 300, a three-dimensional boundary of the object is defined based upon the two-dimensional boundary, the first intersection, and the second intersection. By way of example, in some embodiments, the two-dimensional boundary is interpolated between the first intersection (e.g., and first boundary plane) and second intersection (e.g., and second boundary plane) to reproject the boundary through a volume bounded by the first boundary plane and the second boundary plane.

In some embodiments, the three-dimensional boundary includes a buffer region and thus may not be limited to include merely a volume bounded by the two-dimensional boundary, the first boundary plane, and/or the second boundary plane. By slightly enlarging the three-dimensional boundary, portions of the object 104 that were not within the two-dimensional boundary and/or a boundary plane are included with the three-dimensional boundary, such as handles, legs, etc., that may not be initially identified as edges of the object 104.

Figure 12:
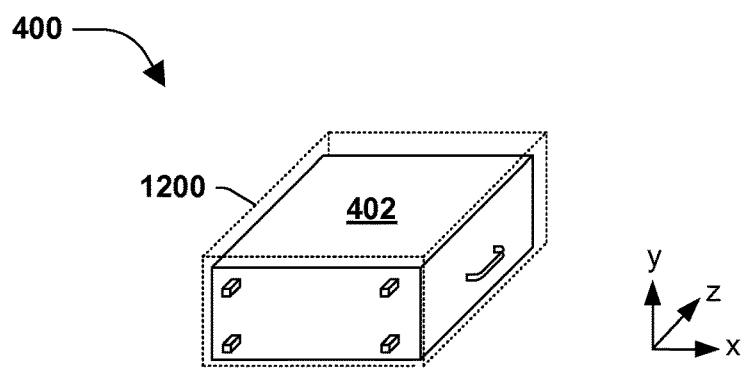
FIG. 12 illustrates a three-dimensional boundary.

Referring to FIG. 12, an example three-dimensional boundary 1200 is illustrated that is imposed upon the three-dimensional image 400. Portions of the three-dimensional image 400 not within the three-dimensional boundary 1200 have been removed for clarity. The three-dimensional boundary 1200 includes a buffer region on the top, front, back, left, and right of the suitcase 402 to increase the probability that handles, feet, etc., are included within the three-dimensional boundary 1200.

At 322 in the example method 300, voxels within the three-dimensional boundary are extracted to generate a three-dimensional object image (e.g., depicting little, if any, of the secondary object 105). Voxels not within the three-dimensional boundary may be discarded and/or zeroed (e.g., to remove the content of those voxels). By removing or zeroing some voxels, computational resources are saved by not performing further examination on such voxels (e.g., where such voxels represent a bin that is not of interest). In some embodiments, the three-dimensional object image may be rotated to a defined position relative to a monitor after extraction at 322 and/or to a defined, but non-displayed, reference position. By way of example, Eigen analysis may be performed on the three-dimensional object image to identify a longest dimension of the three-dimensional object image, and the three-dimensional object image may be rotated such that the longest dimension extends left-to-right on a monitor, for example.

It may be appreciated that the example method 300 is merely provided as an example and is not intended to be interpreted as a limiting example. By way of example, the order of acts described with respect to the example method 300 may be arranged differently and/or additional acts may be included (e.g., to refine the approximation of the border). By way of example, in some embodiments, the volume extracted at 314 may be projected twice, such as at both boundary planes. As another example, the projection image may be projected multiple times (e.g., 3, 4, 5, etc., times) to further refine the location of edges, for example. Moreover, as will be described in greater detail with respect to FIGS. 15-17, in some embodiments, a search is performed on planes extending at a predefined angle relative to the search path (e.g., as opposed to identifying an intersection of the search path between the object and the search path).

Figure 13:
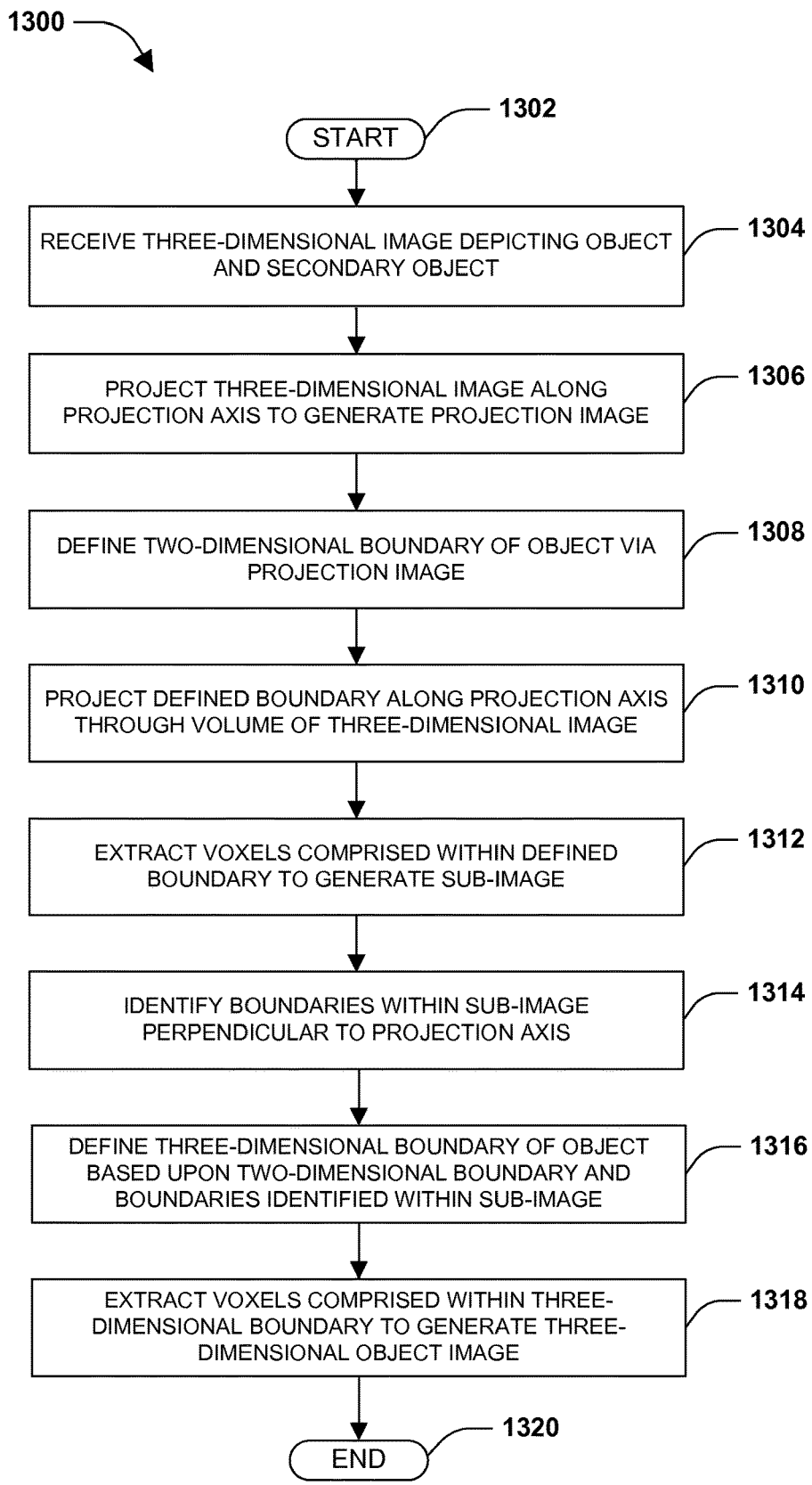
FIG. 13 illustrates flow diagram illustrating an example method for extracting a volume of an object from a three-dimensional image depicting the object and a secondary object.

Referring to FIG. 13, another example method 1300 is described for extracting a volume of an object 104 from a three-dimensional image depicting the object 104 and a secondary object 105. It may be appreciated that for purposes of brevity, actions described by the example method 300 are not described in detail below.

The example method 1300 begins at 1302 and a three-dimensional image depicting the object 104 and the secondary object 105 is received at 1304. The three-dimensional image is projected along a projection axis at 1306 to generate a two-dimensional projection image. For example, the three-dimensional image is projected along a y-axis to generate a two-dimensional projection image depicting the x- and z-dimensions of the three-dimensional image.

At 1308 in the example method 1300, a two-dimensional boundary of the object is identified using the two-dimensional projection image and/or one-dimensional projection lines generated therefrom. The two-dimensional boundary is projected along the projection axis through the volume of the three-dimensional image at 1310, and voxels of the three-dimensional image within the defined boundary are extracted at 1312 to generate a sub-image. It may be appreciated that because the defined boundary was projected through the volume of the three-dimensional image (e.g., and was not bounded by bounding planes as described with respect to the example method 300), the sub-image may depict at least some fragments of the secondary object 105 as well as voids and/or noisy regions external to the object 104.

At 1314 boundaries within the sub-image that are substantially perpendicular to the projection axis are identified (e.g., thus creating the effect of identifying bounding or boundary planes). At 1316 in the example method 1300, a three-dimensional boundary of the object is defined based upon the two-dimensional boundary and the boundaries identified within the sub-image (e.g., at 1314). Voxels comprised within the three-dimensional boundary are extracted at 1318 to generate a three-dimensional object image.

The example method 1300 ends at 1320.

Figure 14:
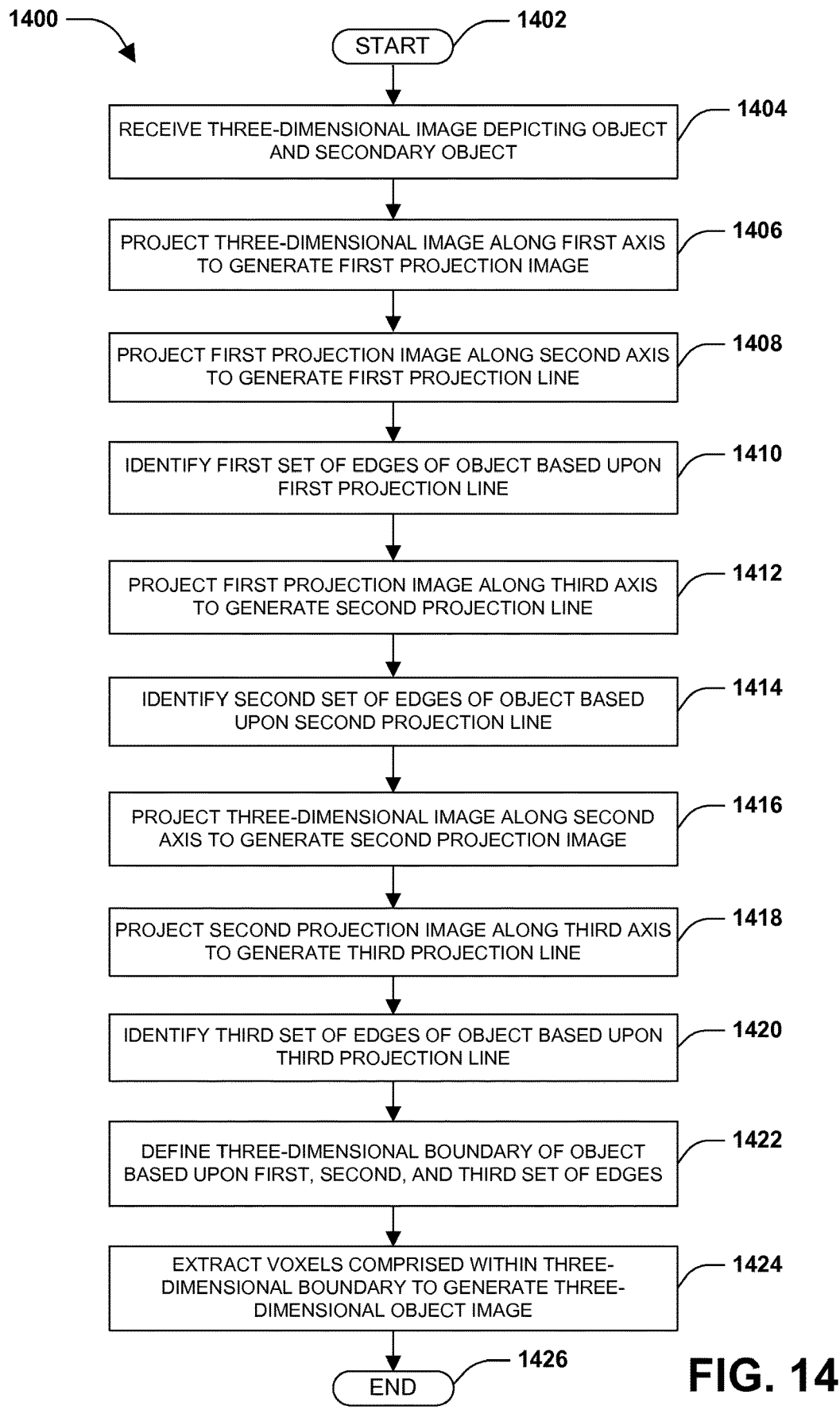
FIG. 14 illustrates flow diagram illustrating an example method for extracting a volume of an object from a three-dimensional image depicting the object and a secondary object.

Referring to FIG. 14, another example method 1400 is described for extracting a volume of an object 104 from a three-dimensional image depicting the object 104 and a secondary object 105. It may be appreciated that for purposes of brevity, actions described by the example method 300 are not described in detail below.

The example method 1400 begins at 1402, at a three-dimensional image depicting the object 104 and the secondary object 105 is received at 1404. At 1406, the three-dimensional image is projected along a first axis (e.g., x-axis) to generate a first projection image (e.g., depicting a y, z plane). At 1408, the first projection image is projected along a second axis (e.g., the y-axis) to generate a first projection line. The first projection line can be analyzed to identify a first set of one or more edges of the object at 1410.

At 1412 in the example method 1400, the first projection image is projected along a third axis (e.g., the z-axis) to generate a second projection line, and a second set of one or more edges of the object are identified at 1414.

At 1416 in the example method 1400, the three-dimensional image is projected along the second axis (e.g., the y-axis) to generate a second projection image (e.g., depicting an x, z plane). At 1418 in the example method 1400, the second projection image is projected along a third axis (e.g., the z-axis) to generate a third projection line, and the third projection line is analyzed to identify a third set of one or more edges of the object at 1420.

In this way, using the acts describes at 1404-1420, edges that are identifiable from at least three different dimensions of the object may be identified. Using the first, second, and third sets of edges, a three-dimensional boundary of the object may be defined at 1422, and voxels comprised within the three-dimensional boundary may be extracted at 1424 to generate a three-dimensional object image.

It may be appreciated that while the example method 1400 describes generating the second projection image from the three-dimensional image, in other embodiments, the second projection image may be derived by projecting a three-dimensional sub-image. By way of example, the first and second sets of edges may be used to define a two-dimensional boundary and the two-dimensional boundary may be reprojected across the volume of the three-dimensional image (e.g., as described with respect to 1310 in FIG. 13) to generate a three-dimensional sub-image, which is projected to generate the second projection image.

In some embodiments, such as in applications where at least some of the objects are irregularly shaped, planes and/or object slices that are angled at some angle relative to the search path (e.g., such as planes that are perpendicular to the search path) may be examined to identify the first boundary plane (e.g., where a first edge of the object is encountered) and the second boundary plane (e.g., where a last edge of the object is encountered). Accordingly, the example method 300 may be modified slightly to examine planes and/or slices of the three-dimensional image as opposed to identifying intersections between the object and the search path. By way of example, the action described at 308 in the example method 300 may be replaced with identifying a first boundary plane by examining a set of planes angled at a predefined angle relative to the search path (e.g., a set of planes perpendicular to the search path) to identify a first instance of the object (e.g., a first edge of the object). Moreover, the action described at 310 in the example method 300 may be replaced with identifying a second boundary plane by examining the set of planes to identify a second instance of the object (e.g., a last edge of the object). Moreover, because such boundary planes are identified at 308 and 310, the action described at 312 in the example method 300 may be eliminated.

Figure 15:
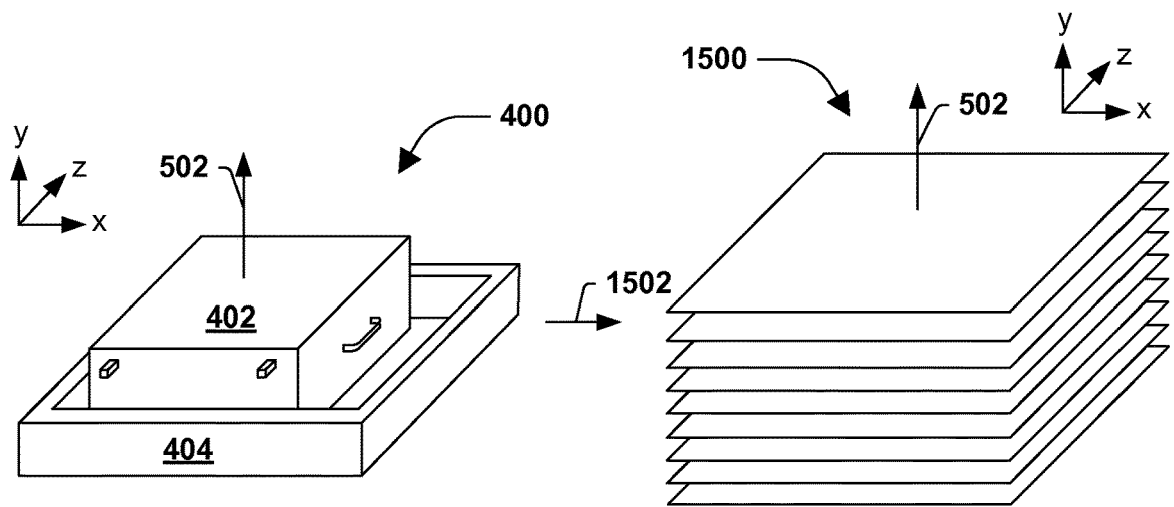
FIG. 15 illustrates set of planes yielded from a three-dimensional image depicting an object and a secondary object.
Figure 16:
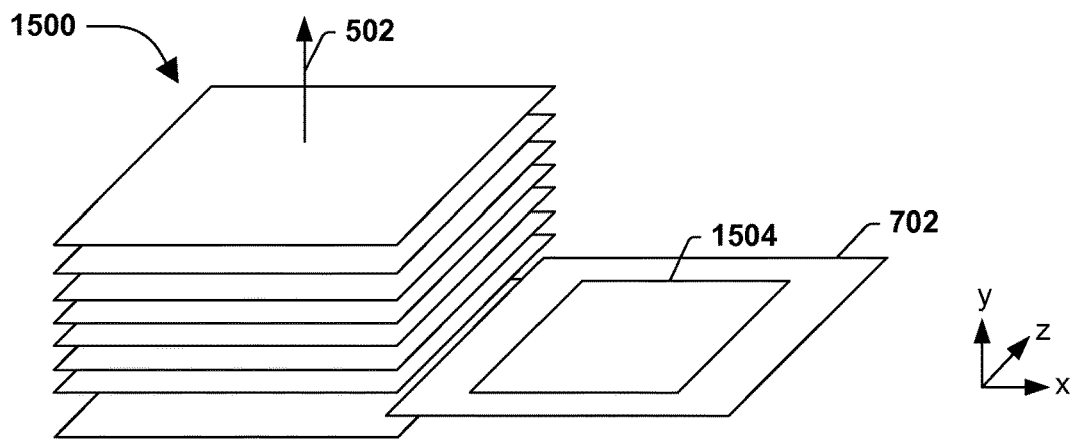
FIG. 16 illustrates a first boundary plane yielded from a set of planes.
Figure 17:
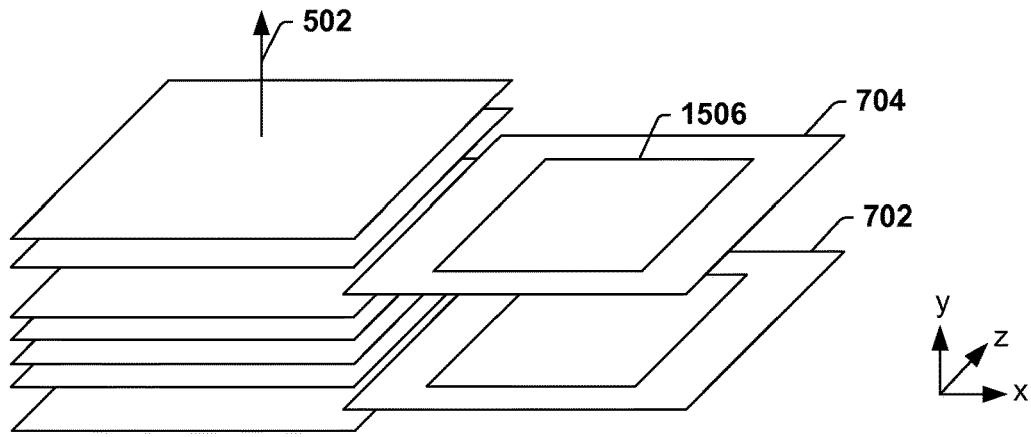
FIG. 17 illustrates a second boundary plane yielded from a set of planes.

Referring to FIGS. 15-17, illustrations are provided to the further describe the foregoing actions. The three-dimensional image 400 received at 304 may be decomposed 1502 into a set of planes 1500 angled at a predefined angle relative to the search path (e.g., represented by line 502) as illustrated by FIG. 15. By way of example, the set of planes 1500 may be perpendicular to the search path. Respective planes along the search path may be examined (e.g., sequentially) to determine whether the plane represents a portion of the suitcase 402. A first plane, along the search path, in which a portion of the suitcase 402 is identifiable may be treated as a first boundary plane. By way of example, referring to FIG. 16, the first boundary plane 702 is identified in the set of planes 1500 because a first edge 1504 of the suitcase 402 lies within the plane. It may be appreciated that respective planes may be analyzed in 2D space (e.g., where pixels are analyzed to determine if an intensity of the pixel corresponds to a possible edge of an suitcase 402) and/or in 1D space (e.g., by converting the 2D plane to a 1D projection line as previously described and analyzing the 1D projection line to identify possible edges (e.g., which may appear as peaks in the 1D projection line). Next, a second plane (e.g., last plane), along the search path, in which a portion of the suitcase 402 is identifiable may be treated as a second boundary plane. By way of example, referring to FIG. 17, the second boundary plane 704 is identified in the set of planes because a second edge 1506 (e.g., last edge) of the suitcase 402 lies within the plane. Using these first and second boundary planes 702, 704, a volume of the three-dimensional image between the first boundary plane 702 and the second boundary plane 704 may be extracted as further described with respect to 314 in the example method 300.

Figure 18:
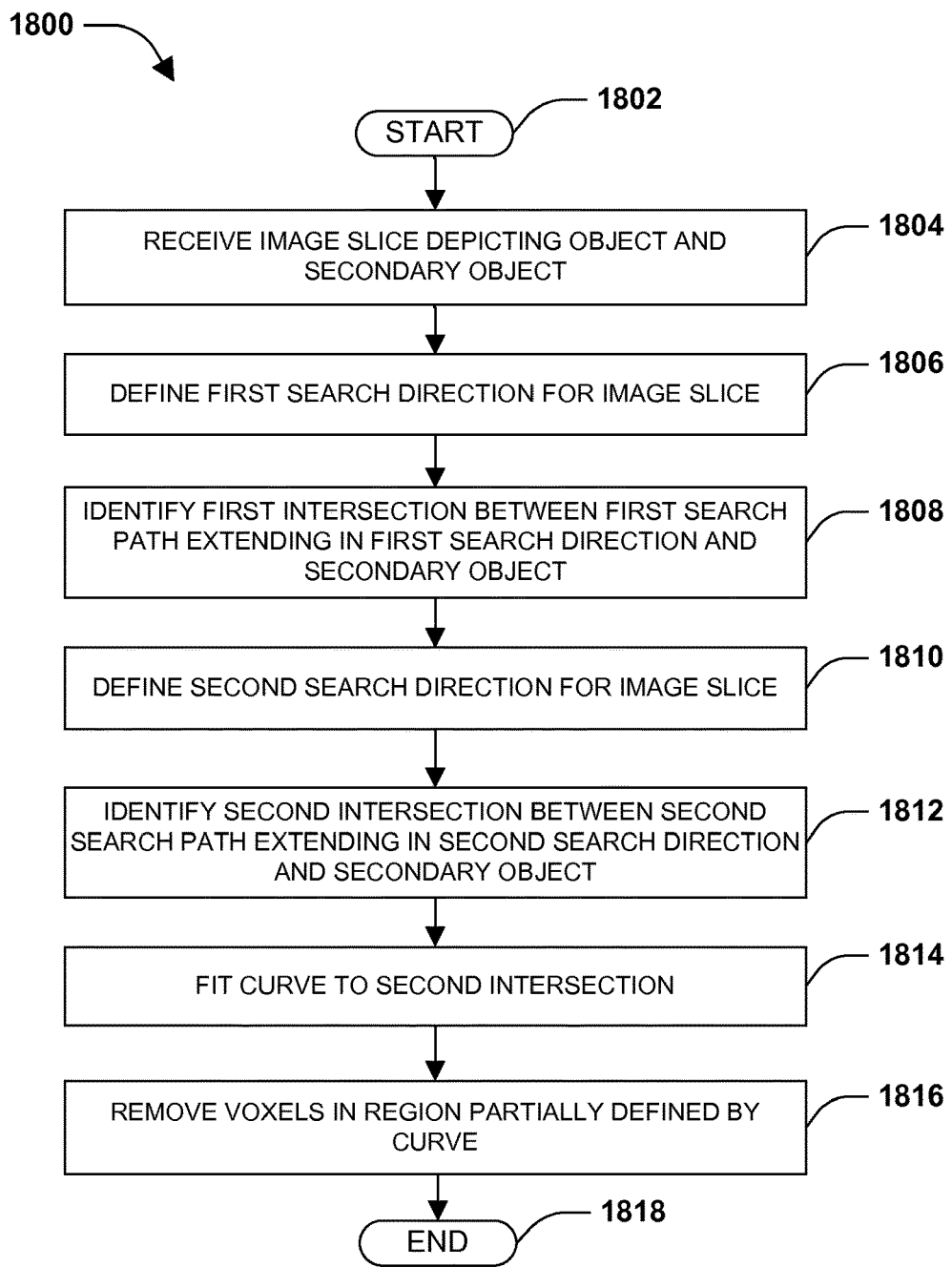
FIG. 18 illustrates flow diagram illustrating an example method for extracting voxels of the image representing the object.

In some embodiments, characteristics of a bin or other secondary object may be known and these known characteristics may be used when extracting an image of an object (e.g., luggage) from an image depicting both the object and the secondary object. By way of example, in a security screening application, respective bins may comprise a barcode, radio-frequency tag, of other identifier that can be used to identify a bin under examination. Using such an identifier, characteristics of the bin, such as a size and/or shape of the bin can be determined (e.g., by comparing the identifier to a database listing identifiers and characteristics of respective bins). In other applications, respective bins that are subject to examination may be of a uniform size and/or shape and thus uniquely identifying respective bins may be optional.

Where characteristics of a secondary object are known (e.g., either because the secondary object conforms to a set of known characteristics and/or because characteristics of the secondary object can be determined based upon a unique identifier), the characteristics of the secondary object can be utilized to assist in defining a boundary of an object and/or defining a boundary between an object and a secondary object in an image for purposes of extracting voxels of the image that represent the object. Referring to FIG. 18, an example method 1800 is illustrated for extracting voxels of the image representing the object. Throughout the description of the example method 1800, reference is made to FIGS. 19-20, which depict the example method 1800 being implemented on an image slice.

The example method 1800 begins at 1802, and an image slice depicting the object 1902 and the secondary object 1904 is received at 1804. An image slice is a three-dimensional image representing a slice of the object and the secondary object. For example, an image slice may represent a portion of the object and a portion of the secondary object located under a focal spot of the radiation source during a single full rotation (e.g., 360°) around the object and secondary object or during a partial rotation (e.g., 180°) around the object and secondary object. In some embodiments, hundreds of image slices may be acquired during an examination of the object and the secondary object. In some embodiments, respective image slices may be so thin in one dimension (e.g., such as a z-dimension that corresponds to a direction in which the object and secondary object are translated), that the image slices approximate a two-dimensional plane as illustrated by the image slice 1900 in FIGS. 19 and 20.

At 1806 in the example method 1800, a first search direction for the image slice is defined. The first search direction may be defined with respect to the support article 110. For example, in some embodiments, the first search direction is perpendicular to a plane of the support article 110 upon which the secondary object 1904 rests (e.g., where the first search direction would correspond to the x-direction in FIGS. 19 and 20).

At 1808, a first intersection 1908 between a first search path 1906, extending in the first search direction (e.g., the x-direction), and the secondary object 1904 is identified. The first intersection 1908 may be identified based upon a voxel (e.g., or pixel) of the image slice 1900 having one or more characteristics attributable to the secondary object 1904. By way of example, in a CT image, voxels representative of the secondary object 1904 may have a CT value within a certain range of CT values. In some embodiments, these CT values can be used to identify the first intersection 1908, although other edge detection techniques are also contemplated for detecting the first intersection 1908. In some embodiments, the first intersection 1908 may correspond to an initial location along the first search path 1906 where the secondary object 1904 and the first search path 1906 intersect. In this way, the first intersection 1908 is proximate a first edge of the secondary object 1904, for example.

Although not illustrated in the example method 1800, other intersections between the first search path 1906 and the secondary object 1904 may also be identified. For example, a second intersection 1910 between the first search path 1906 and the secondary object 1904 may be identified (e.g., using a technique similar to a technique used to identify the first intersection 1908). In some embodiments, the second intersection 1910 may correspond to a last location along the first search path 1906 where the secondary object 1904 and the first search path 1906 intersect. In this way, the second intersection 1910 is proximate a second edge of the secondary object, for example. Moreover, although not illustrated in the example method 1800, multiple search paths may be defined that extend in the first search direction, and one or more intersections between respective search paths and the secondary object 1904 may be identified.

At 1810, a second search direction for the image slice is defined. The second search direction may be defined with respect to the support article 110 and/or with respect to the first search direction. For example, in some embodiments, the second search direction is perpendicular to the first search direction and lies within a rotational plane defined by the rotating gantry 106 (e.g., where the second search direction would correspond to the y-direction in FIGS. 19 and 20 if the rotational plane corresponded to an x, y plane).

At 1812, an intersection 1914*a* between a second search path 1912*a*, extending in the second search direction, and the secondary object 1904 is identified (e.g., using a technique similar to a technique used at 1808). In some embodiments, where the second search path 1912*a* extends in the y-direction, merely a top intersection (e.g., furthest from the support article 110) of the secondary object 1904 and the second search path 1912*a* is identified for the second search path 1912*a*.

In some embodiments, the second search path 1912*a* is defined to be a search path extending in the second search direction and spatially proximate the first intersection 1908 and/or the second intersection 1910 (e.g., to be near an edge of the secondary object 1904). In some embodiments, the second search path 1912*a* is defined to be positioned between the first intersection 1908 and the second intersection 1910.

Figure 19:
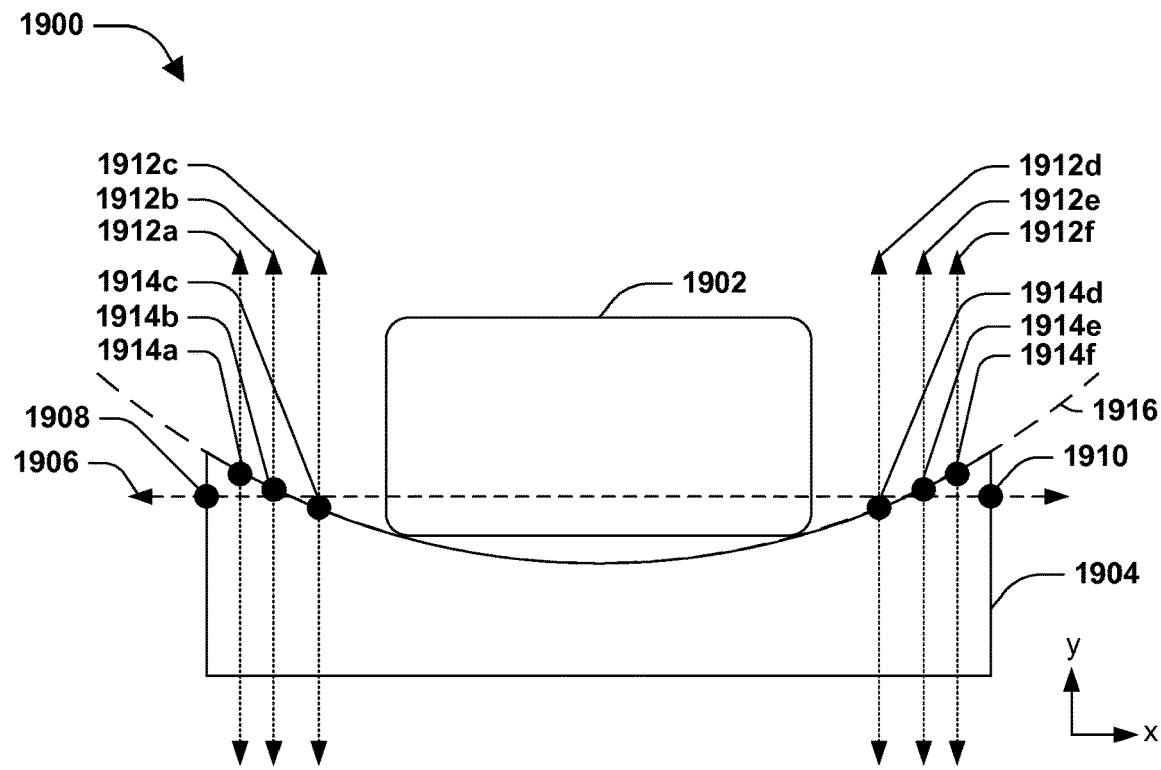
FIG. 19 illustrates an image slice of an object and a secondary object.
Figure 20:
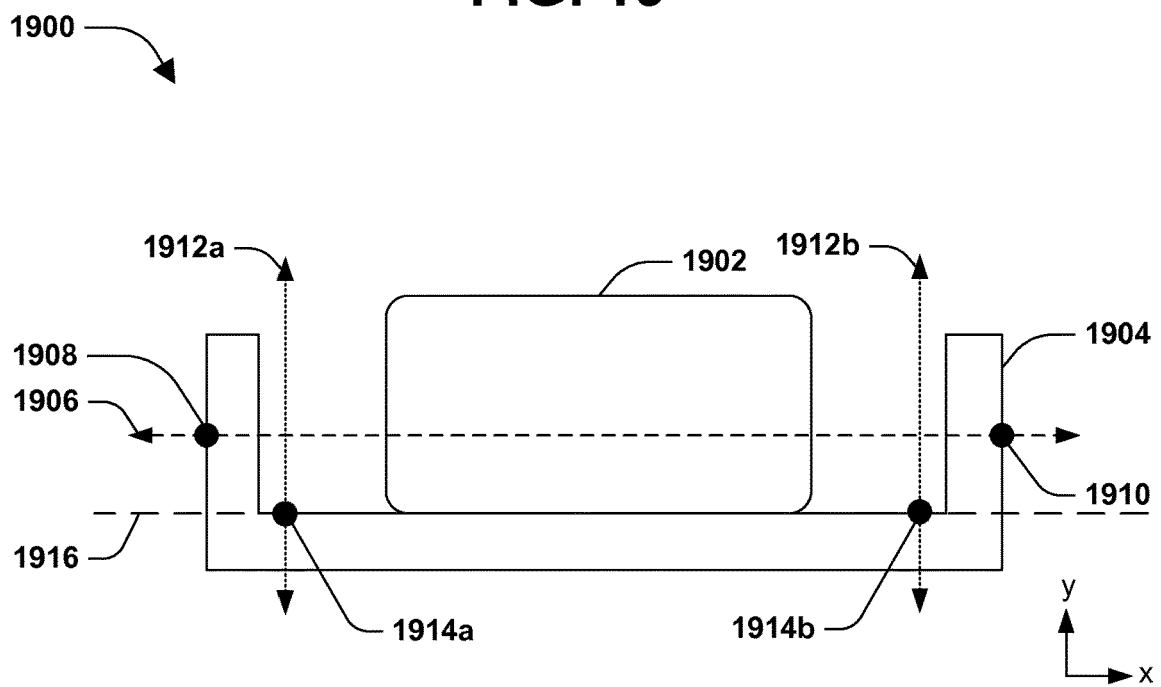
FIG. 20 illustrates an image slice of an object and a secondary object.

In some embodiments, as illustrated in FIGS. 19 and 20, other search paths 1912, extending in the second search direction, may also be defined and intersections 1914 between the other search paths and the secondary object 1904 may be also identified.

At 1814, a curve 1916 is fit to the intersection 1914*a* identified at 1812 and/or other intersections 1914 between other search paths 1912 extending in the second direction and the secondary object 1904. The curve 1916 may be linear or non-linear and lays on a surface of the secondary object 1904 upon which the object 1902 rests during the examination. In embodiments where merely one intersection is identified from the search path(s) extending in the second direction, for example, a priori knowledge about the secondary object 1904 may also be used to fit the curve 1916 at 1814. For example, where the secondary object 1904 has a substantially planar surface upon which the object 1902 rests, a y-coordinate of the surface may be determined based upon merely the intersection 1914*a*.

At 1816, voxels (e.g., or pixels) in a region partially defined by the curve 1916 (e.g., voxels below the curve) are removed, zeroed, etc., to remove the secondary object 1904 from the image slice 1900. In some embodiments, such as illustrated in FIG. 19, removing voxels (e.g., or pixels) below the curve 1916 removes nearly all of the secondary object 1904 from the image slice 1900. In other embodiments, such as illustrated in FIG. 20, at least a portion of the voxels (e.g., or pixels) corresponding to the secondary object 1904 may be above the curve 1916 and thus not removed, zeroed, etc., at 1816. In some embodiments, these remaining voxels (e.g., or pixels) may be removed using a buffer rule which provides that voxels within a specified spatial proximity of the first intersection 1908 and/or the second intersection 1910 are removed, for example.

The example method 1800 may be repeated for a plurality of image slices corresponding to the object 1902 and/or the secondary object 1904. In some embodiments, the example method 1800 may be repeated for every image slice. In some embodiments, the example method 1800 may be repeated for less than all of the image slices and interpolation and/or extrapolation techniques may be applied to estimate which voxels (e.g., or pixels) to remove from respective image slices. Subsequently, when the image slices are combined, the image slices do not represent the secondary object, for example.

The example method 1800 ends at 1818.

Figure 21:
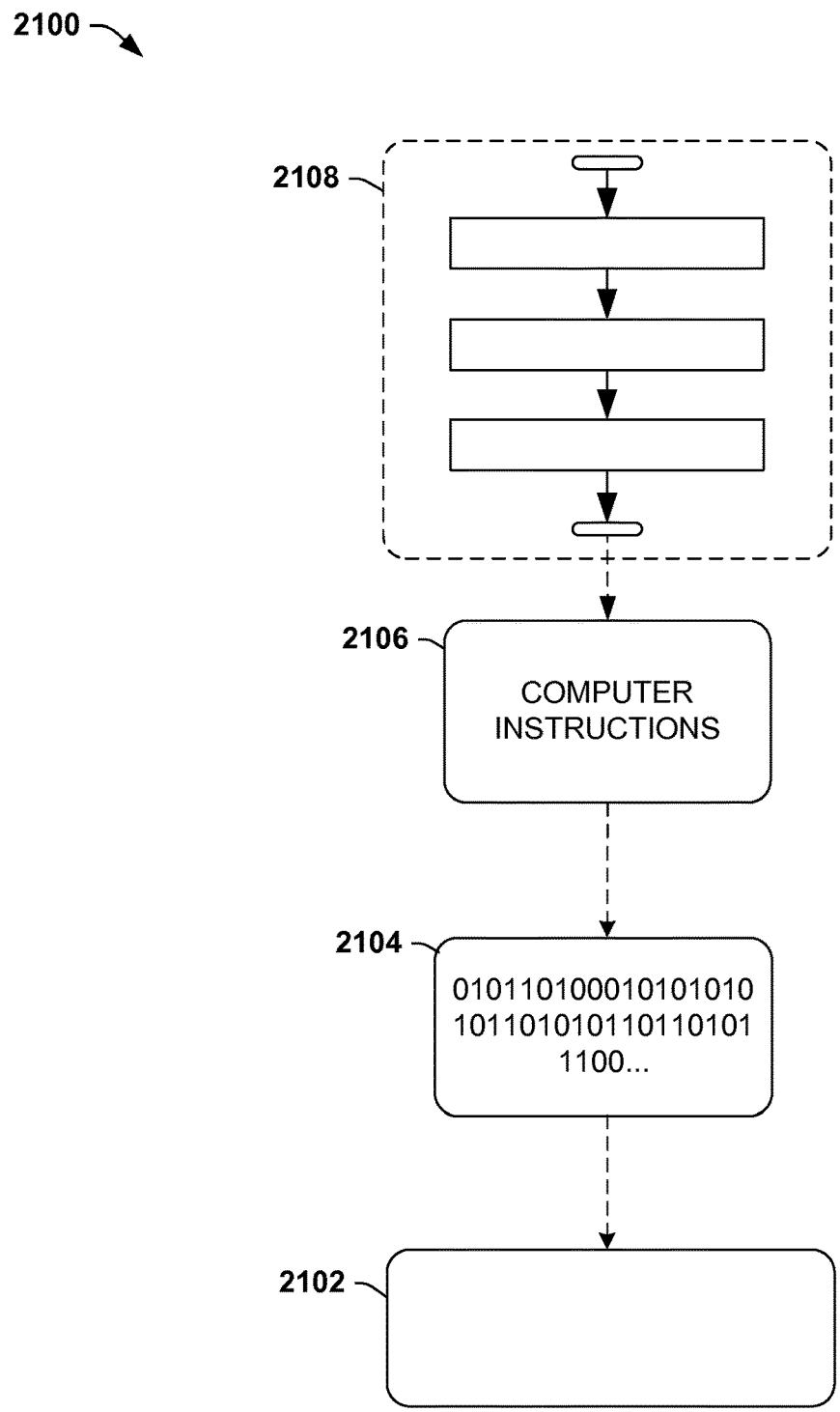
FIG. 21 is an illustration of an example computer-readable medium comprising processor-executable instructions configured to embody one or more of the provisions set forth herein.

Still another embodiment involves a computer-readable medium comprising processor-executable instructions configured to implement one or more of the techniques presented herein. An example computer-readable medium that may be devised in these ways is illustrated in FIG. 21, wherein the implementation 2100 comprises a computer-readable medium 2102 (e.g., a flash drive, CD-R, DVD-R, application-specific integrated circuit (ASIC), field-programmable gate array (FPGA), a platter of a hard disk drive, etc.), on which is encoded computer-readable data 2104. This computer-readable data 2104 in turn comprises a set of processor-executable instructions 2106 configured to operate according to one or more of the principles set forth herein. In one such embodiment 2100, the processor-executable instructions 2106 may be configured to perform a method 2108 when executed via a processing unit, such as at least some of the example method 300 of FIG. 3, at least some of the example method 1300 of FIG. 13, at least some of the example method 1400 of FIG. 14, and/or at least some of the example method 1800 of FIG. 18. In another such embodiment, the processor-executable instructions 2106 may be configured to implement a system, such as at least some of the radiation system 100 of FIG. 1. Many such computer-readable media may be devised by those of ordinary skill in the art that are configured to operate in accordance with one or more of the techniques presented herein. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

As used in this application, the terms "component," "module," "system," "interface," and the like, are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or." In addition, "a" and "an" as used in this application are generally to be construed to mean "one or more" unless specified otherwise or clear from context to be directed to a singular form. Also, at least one of A and B and/or the like generally means A or B or both A and B. Furthermore, to the extent that "includes," "having," "has," "with," or variants thereof are used in either the detailed description or the claims, such terms are intended to be inclusive in a manner similar to the term "comprising." The claimed subject matter may be implemented as a method, apparatus, or article of manufacture (e.g., as software, firmware, hardware, or any combination thereof).

Further, unless specified otherwise, "first," "second," and/or the like, are not intended to imply a temporal aspect, a spatial aspect, an ordering, etc. Rather, such terms are merely used as identifiers, names, etc., for features, elements, items, etc. (e.g., "a first channel and a second channel" generally correspond to "channel A and channel B" or two different (or two identical) channels or the same channel).

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and/or advantageous for any given or particular application.

What is claimed is:

1. A method for generating a three-dimensional object image from a three-dimensional image depicting an object and a secondary object, comprising:

projecting the three-dimensional image along a first axis to generate a first two-dimensional projection image;

first adding a two-dimensional boundary encompassing the object responsive to the first two-dimensional projection image;
second adding a three-dimensional boundary encompassing the object within the three-dimensional image by projecting the two-dimensional boundary over at least a portion of the three-dimensional image; and
extracting voxels comprised within the three-dimensional boundary to generate the three-dimensional object image depicting the object but not depicting the secondary object.

2. The method of claim 1, wherein the object is a suitcase.

3. The method of claim 2, wherein the secondary object is a luggage bin.

4. The method of claim 1, comprising:
projecting the two-dimensional boundary along a second axis, different than the first axis, to generate a first one-dimensional projection line; and
identifying a first set of one or more edges of the object responsive to the first one-dimensional projection line.

5. The method of claim 4, comprising:
projecting the two-dimensional boundary along a third axis, different than the first axis and different than the second axis, to generate a second one-dimensional projection line; and
identifying a second set of one or more edges of the object responsive to the second one-dimensional projection line.

6. The method of claim 5, comprising characterizing the two-dimensional boundary responsive to the first set of one or more edges and the second set of one or more edges.

7. The method of claim 1, comprising:
reprojecting the two-dimensional boundary over at least a portion of the three-dimensional image to generate a three-dimensional sub-image.

8. The method of claim 7, comprising:
projecting the three-dimensional sub-image along a second axis, different than the first axis, to generate a second two-dimensional projection image.

9. The method of claim 8, comprising:
identifying a third set of one or more edges of the object responsive to the second two-dimensional projection image.

10. The method of claim 9, the second adding the three-dimensional boundary comprising adding the three-dimensional boundary responsive to the third set of one or more edges.

11. The method of claim 8, the comprising:
projecting the second two-dimensional projection image along a third axis, different than the second axis, to generate a third one-dimensional projection line; and
identifying a third set of one or more edges of the object responsive to the third one-dimensional projection line.

12. The method of claim 1, comprising, prior to the projecting:
adding a search path relative to the three-dimensional image;
generating a set of planes angled at a predefined angle relative to the search path;
identifying a first boundary plane by sequentially examining the set of planes to identify a first edge of the object; and trimming the three-dimensional image responsive to the first boundary plane.

13. The method of claim 1, at least one of the first adding the two-dimensional boundary or second adding the three-dimensional boundary responsive to user input.

14. The method of claim 1, wherein the three-dimensional image is yielded from a radiation examination of the object and the secondary object.

15. A system comprising:
a processing unit; and
memory configured to store instructions that when executed by the processing unit perform a method, comprising:
projecting a three-dimensional image of an object and a secondary object in which the object is situated during a radiation examination to generate a two-dimensional projection image;
adding a two-dimensional boundary encompassing the object responsive to the two-dimensional projection image;
projecting the two-dimensional boundary over a portion of the three-dimensional image to add a three-dimensional boundary encompassing the object; and
extracting voxels comprised within the three-dimensional boundary to generate a three-dimensional object image depicting the object but not depicting the secondary object.

16. The method of claim 15, the method comprising presenting the two-dimensional projection image to a user.

17. The method of claim 16, the adding comprising adding the two-dimensional boundary responsive to user input received responsive to the presenting.

18. The method of claim 15, the projecting comprising projecting the three-dimensional image along a first axis and the method comprising:
projecting the two-dimensional projection image along a second axis, different than the first axis, to generate a one-dimensional projection line; and
identifying an edge of the object responsive to the one-dimensional projection line.

19. The method of claim 18, the adding comprising adding the two-dimensional boundary responsive to the edge.

20. A computer-readable medium comprising computer executable instructions that when executed perform a method for generating a three-dimensional object image from a three-dimensional image depicting an object and a secondary object, the method comprising:
projecting a three-dimensional image along a first axis to generate a first two-dimensional projection image;
adding a two-dimensional boundary encompassing the object responsive to the first two-dimensional projection image;
adding a three-dimensional boundary encompassing the object within the three-dimensional image by projecting the two-dimensional boundary over at least a portion of the three-dimensional image; and
extracting voxels comprised within the three-dimensional boundary to generate the three-dimensional object image depicting the object but not depicting the secondary object.

* * * * *

UNITED STATES PATENT AND TRADEMARK OFFICE
CERTIFICATE OF CORRECTION

PATENT NO. : 11,436,735 B2
APPLICATION NO. : 15/550402
DATED : September 6, 2022
INVENTOR(S) : David Lieblich, Nirupam Sarkar and Daniel B. Keesing Page 1 of 1

It is certified that error appears in the above-identified patent and that said Letters Patent is hereby corrected as shown below:

In the Specification
Column 14, Line 61, change "line)." to --line)).--

Signed and Sealed this
Eighteenth Day of April, 2023

Katherine Kelly Vidal
*Director of the United States Patent and Trademark Office*